United States Patent Office 2,910,401
Patented Oct. 27, 1959

2,910,401
SULFURIZED COMPOSITIONS AND PESTICIDAL COMPOSITIONS COMPRISING THE SAME COMPOUNDS

Irving D. Webb and John W. Yale, Jr., Yorba Linda, Calif., assignors, by mesne assignments, to Collier Carbon and Chemical Corporation, a corporation of California No Drawing. Application January 21, 1958
Serial No. 710,191

20 Claims. (Cl. 167—22)

This invention relates to new chemical products, and in particular relates to new sulfurized compounds of unknown structure obtained by reacting certain tetrakis (alkylmercapto)ethanes with elemental sulfur. It further relates to pest control compositions and methods in which such sulfurized compounds are employed as the essential active ingredient.

The present invention is based on our discovery that elemental sulfur can be chemically combined with certain tetrakis(alkylmercapto)ethanes of the general formula:

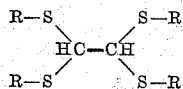

wherein each R represents an alkyl radical containing from 1 to 3 carbon atoms (methyl, ethyl, iso-propyl or n-propyl) to form a group of novel sulfurized compounds which may contain from 1 to as many as about 20 atoms of added sulfur, and which take the form of dark-colored heavy liquids useful as extreme pressure additives for hydrocarbon oils and especially as active ingredients in compositions for the control of various pests.

The tetrakis(alkylmercapto)ethanes which are employed as reactants in preparing the novel compounds of the invention are obtained by reaction between glyoxal and four molecular equivalents of the corresponding alkyl mercaptan. The reaction takes place readily at temperatures between about 25° C. and about 150° C., and is advantageously promoted by the presence of a catalytic amount of an acid such as hydrochloric acid or sulfuric acid. The reaction is exothermic to such an extent that external heating may often be eliminated, and, if desired, it may be carried out in the presence of an inert reaction medium, such as benzene or xylene, which assists in dissipating the heat of reaction. Also, sufficient of an aqueous mineral acid may be employed to serve as a reaction medium as well as a catalyst. Upon completion of the reaction the reaction medium is distilled off to obtain the tetrakis(alkylmercapto)ethane product in crude form. The crude product is suitably purified by fractional distillation or crystallization. Tetrakis(methylmercapto) ethane, prepared from glyoxal and methyl mercaptan, is preferred for use in preparing the present products.

The reaction between a tetrakis(alkylmercapto)ethane and elemental sulfur to form the novel products of the invention takes place readily upon heating a mixture of the two reactants at such temperature and for such a period of time that the sulfur becomes chemically bound to the tetrakis(alkylmercapto)ethane and does not separate in free form when the reaction mixture is cooled or is diluted with a solvent such as acetone. If a mixture of free sulfur and the tetrakis(alkylmercapto)ethane is gradually heated it will be observed that at a relatively low temperature, e.g., 70° C., the sulfur dissolves and the mixture becomes a single liquid phase. If the heating is stopped at this point and the mixture is allowed to cool to about 20° C., substantially all of the free sulfur precipitates, thus indicating that mere physical solution rather than chemical reaction has occurred. On the other hand, if the heating is continued and the temperature is allowed to increase to about 150° C. and remain there for a suitable period of time, the liquid reaction mixture will not deposit free sulfur upon cooling, thereby indicating that true chemical reaction has occurred. Accordingly, in preparing the present sulfurized products it is necessary that the two reactants be heated at such temperature and for such period of time that upon subsequent cooling to atmospheric temperature at least 1 atom of sulfur per molecule of the tetrakis(alkylmercapto)ethane remains unprecipitated. However, the temperature should not be so high and/or the reaction time so long that any substantial degree of decomposition takes place, as is indicated by the reaction mixture losing weight. The operable temperature range varies with the amount of sulfur sought to be combined with the tetrakis(alkylmercapto)ethane, but is usually at least about 125° C., and is preferably not greater than about 200° C. In preparing sulfurized products containing more than about 8 atoms of added sulfur per molecule of the tetrakis(alkylmercapto)ethane, it is desirable to promote the reaction by carrying it out in the presence of a small amount, e.g., 1–5 percent by weight of the reaction mixture, of a metal salt Lewis acid, e.g., a Friedel-Crafts catalyst such as zinc chloride. Such catalyst may of course be likewise employed in preparing products containing about 8 or less atoms of sulfur per molecule of the tetrakis(alkylmercapto)ethane.

The time required for completion of the reaction likewise depends upon the amount of sulfur to be combined with the tetrakis(alkylmercapto)ethane as well as upon the reaction temperature and the presence or absence of a catalyst. Ordinarily, however, such time is between about ¼ and about 24 hours, and as a general rule it will be found that heating the reactant mixture at a temperature between about 145° C. and about 155° C. for a period of time between about 1 and about 6 hours will lead to optimum results.

The proportion in which sulfur can be combined with the tetrakis(alkylmercapto)ethane to form the present class of products varies from 1 to about 20 atoms of sulfur per molecule of the tetrakis(alkylmercapto)ethane. Accordingly, in preparing such products, at least between 1 and about 20 atomic weights of sulfur are provided per molecular weight of the tetrakis(alkylmercapto)ethane, which is equivalent to between about 0.15 and about 3 parts by weight of sulfur per part by weight of the tetrakis(alkylmercapto)ethane. If desired, the sulfur may be provided in excess of theoretical, in which case the unreacted sulfur is separated from the sulfurized product by cooling the latter and filtering off the unreacted sulfur which is thereby precipitated.

Procedurewise, the reaction is carried out simply by charging the desired amounts of the two reactants into a reaction vessel and heating the mixture under the conditions previously described. In the interests of minimizing decomposition, the heating may be effected under superatmospheric pressure, but ordinarily it is preferred to operate at atmospheric temperature and to avoid decomposition by maintaining a suitably low reaction temperature. Also, if desired, the reaction can be carried out in the presence of an inert liquid reaction medium, e.g., benzene, toluene, carbon tetrachloride, etc., which can subsequently either be removed from the finished product by distillation or allowed to remain therewith to serve as a dispersing aid in preparing the pest control compositions described below. Ordinarily, however, it is preferred to dispense with the use of reaction media and to effect the reaction by heating a simple mixture of the two reactants. Upon completion of the reaction the product is cooled and filtered to remove any unreacted sulfur which is thereby precipitated, and can then be used as herein disclosed. If desired, small amounts of volatile by-products can be removed by blowing with an inert gas, such as nitrogen, under reduced pressure and/or at a slightly elevated pressure.

The following examples will illustrate the preparation of a number of the members of the present class of sulfurized products, but are not to be construed as limiting the invention:

Example I

Tetrakis(methylmercapto)ethane is obtained as a white crystalline solid (M. P.=61°–62° C.) by mixing 30 parts by weight of glyoxal in the form of a 30% aqueous solution with 200 parts by weight of concentrated hydrochloric acid, and thereafter passing methyl mercaptan into the mixture until it is no longer absorbed. During absorption of the methyl mercaptan, the temperature of the reaction mixture rises to about 75° C. The tetrakis(methylmercaptan)ethane product (hereinafter abbreviated as "TMME") collects on top of the reaction mixture as an oily layer, and is decanted off and allowed to cool to room temperature, whereupon it solidifies. The crude solid is washed with water and is recrystalized from methyl alcohol to obtain the pure TMME in the form of long white needles.

One molecular equivalent of TMME is admixed with four atomic equivalents of free sulfur, and the mixture is heated at 150° C. Periodically, small samples are taken and are diluted with several volumes of acetone to determine if free sulfur is thereby precipitated. When the heating has continued for about 12 hours, the acetone dilution test shows that all of the sulfur has combined chemically with the TMME. The resulting product takes the form of a heavy mobile red liquid containing 4 atoms of sulfur per molecule of TMME. This product is hereinafter abbreviated as "TMME—$S_4$."

The foregoing procedure is repeated, employing six atomic weights of free sulfur per molecular weight of TMME. All of the sulfur reacts in about 16 hours at 150° C. The resulting product (TMME—$S_6$) is a dense mobile dark red liquid.

The foregoing procedure is repeated, employing one atomic weight of sulfur per molecular weight of TMME. The heating was carried out at about 150° C. over a period of 5 hours. The mono-sulfurized product (TMME—$S_1$) is a mobile red liquid.

Approximately 214 parts by weight (1 mole) of TMME, 448 parts by weight (14 atomic equivalents) of free sulfur, and 3.2 parts by weight of zinc chloride are heated at about 140° C. for about 1 hour in a closed vessel. The reaction product is then cooled, and a trace of precipitated sulfur is filtered off. The resulting product (TMME—$S_{14}$) is a dark brown viscous liquid. TMME—$S_{18}$ is prepared in the same manner by increasing the amount of sulfur to 18 atomic equivalents.

Example II

Tetrakis(ethylmercapto)ethane (TEME) is prepared by reacting glyoxal with ethyl mercaptan in the presence of aqueous hydrochloric acid as described in Example I. Approximately 81 parts by weight (0.3 mole) of this product and 19.2 parts by weight (0.6 atomic equivalent) of free sulfur are heated at 150° C. for 5 hours in a closed rocking autoclave. The crude reaction product is cooled to room temperature, filtered, and stripped with dry nitrogen under reduced pressure. The resulting sulfurized product (TEME—$S_2$) is a reddish-brown mobile liquid.

Example III

Tetrakis(isopropylmercapto)ethane (TIME) is prepared by reacting glyoxal with isopropyl mercaptan as described in Example I. A mixture of 34 parts by weight of this product and 13.2 parts by weight of free sulfur is heated at 150° C. for 5 hours, after which it is cooled, filtered, and stripped with dry nitrogen to obtain a dark brown liquid whose analysis corresponds to TIME—$S_4$.

The pest control compositions of the invention are prepared by combining one or a mixture of the above-described sulfurized products with an inert liquid or solid pesticidal carrier material in the conventional manner. Thus, one or a mixture of such products may be dispersed in water with the aid of a dispersing agent to form a concentrate composition which is subsequently diluted with water to form a spray suitable for application to living plants, lumber, and other materials subject to attack by pest organisms. Alternately, the product may be admixed with an inert solid carrier material, such as talc, starch, diatomaceous earth, aluminum silicate, etc. to form dusting compositions which can be employed as such or dispersed in an aqueous or oleaginous vehicle to form a spray. In general, any of the conventional formulation techniques may be followed in employing the present sulfurized products in pest control compositions, and any of the wetting agents, spreaders, sticking agents, diluents, carriers, etc. which are conventionally employed in formulating pest control compositions may be used in combination with the present sulfurized products.

The present sulfurized products are effective in controlling a variety of pest organisms in relatively small quantities, and in the interests of economy they are usually formulated in concentrations of the order of 50–4000 parts per million. The pest control compositions themselves are of course employed in amounts sufficient to secure the desired degree of control, which amounts depend to some extent upon the particular sulfurized product which is employed as the active ingredient as well as upon the particular pest organism involved and the method by which the composition is applied. A preferred embodiment of the invention lies in nematocidal compositions comprising a sulfurized tetrakis(methylmercapto)ethane containing from 1 to 8 atoms of added sulfur (TMME—$S_1$) to (TMME—$S_8$); such compositions are usually applied to nematode-infested soil in amounts sufficient to provide 10–1000 parts of the active ingredient per million parts of soil.

The present compositions are usually marketed in concentrate form, with dilution to the ultimate concentration being effected by the consumer at the point of use. Liquid concentrate compositions usually contain between about 1 and about 15 percent by weight of the active ingredient and sufficient of an emulsifying or dispersing agent to maintain the active ingredient uniformly dispersed in an inert liquid suspending medium. Solid concentrates usually contain between about 5 and about 50 percent by weight of the active ingredient and, optionally, small amounts of spreading agents and other conventional adjuvants.

The following examples will illustrate the formulation of a number of typical pest control compositions comprising various members of the present class of sulfurized products as active ingredients, but are not to be construed as limiting the invention.

Example IV

|  | Pounds |
|---|---|
| TMME—$S_4$ | 2.5 |
| Aluminum silicate | 50.0 |
| Powdered blood albumin | 0.3 |

Example V

|  | Pounds |
|---|---|
| TMME—$S_2$ | 2.5 |
| Powdered blood albumin | 0.3 |
| Water | 50.0 |

The toxic agent and blood albumin are added to the water, and the mixture is then passed through a colloid mill or high speed blender to obtain a concentrate composition which can be diluted 1000:1 with water to obtain a fungicidal spray for application to living plants.

*Example VI*

| | Pounds |
|---|---|
| TEME—$S_8$ | 15.0 |
| Benzene | 50.0 |
| Kerosene extract oil | 100.0 |
| Spray oil | 4000.0 |

This composition is suitable for impregnating lumber.

*Example VII*

| | Pounds |
|---|---|
| TIME—$S_7$ | 2.5 |
| Water | 50.0 |
| Commercial spreading agent | 0.5 |
| Commercial sticking agent | 0.5 |

The ingredients are mixed in a colloid mill and are thereafter diluted with 2000 gallons of water to obtain a spray composition containing about 100 parts per million of the active ingredient.

*Example VIII*

| | Pounds |
|---|---|
| TEME—$S_{13}$ | 2.5 |
| TMME—$S_8$ | 2.5 |
| Diatomaceous earth | 10000.0 |
| Commercial sticking agent | 10.0 |
| Benzene | 25.0 |

The ingredients are thoroughly admixed in a ball mill and after the benzene is evaporated the composition is suitable for use as a fungicidal dusting composition.

In order to demonstrate the activity of the present class of fungicides, the following test procedure is employed: A 2.5-gram sample of the material to be tested and 2 drops of a non-ionic dispersing agent (Triton "X–171" manufactured by Rohm and Haas Co.) are added to sufficient distilled water to make 100 grams and the mixture is homogenized for 3 minutes in a high-speed blender. With the blender still operating, a 3-gram sample of the liquid is removed and is stirred into 75 grams of liquid potato dextrose agar at 45° C., and the agar is transferred to a Petri dish. The agar so prepared contains 1000 p.p.m. of the material to be tested. If lower concentrations, e.g., 10 or 100 p.p.m., are to be tested, 1-gram portions of the concentrate composition in the blender are diluted with agar accordingly. The agar is allowed to cool to room temperature, whereupon it solidifies, and a ¼" disk of the test fungus inoculum is placed on the surface of the agar. The inoculated agar is incubated at room temperature for two days, after which the extent of fungus growth is measured and the percent inhibition of fungus growth is calculated by the formula:

$$100 = \frac{\text{Growth on Test Sample}}{\text{Growth on Blank}} \times 100$$

The following tabulation presents inhibition values obtained by subjecting one of the preferred sulfurized compounds of the invention (TMME—$S_4$) in a concentration of 100 p.p.m. to the foregoing test procedure employing a variety of test organisms:

| Test organism: | Percent inhibition |
|---|---|
| R. solani | 100 |
| S. rolfsii | 100 |
| P. cinnamoni | 100 |
| P. ultimum | 100 |
| S. sclerotiorum | 100 |
| S. fructicola | 100 |
| B. cinerea | 100 |
| A. solani | 100 |

Average for all organisms=100%.

The following tabulation presents the average of the inhibition values obtained when subjecting a number of the present sulfurized compounds and certain well-known commercial fungicides to the above-described procedure:

| | Percent Inhibition |
|---|---|
| Test material: | Average for all organisms tested |
| TMME—$S_1$ | 100 |
| TMME—$S_2$ | 100 |
| TMME—$S_{2.5}$ | 87 |
| TMME—$S_3$ | 100 |
| TMME—$S_4$ | 100 |
| TMME—$S_5$ | 97 |
| TMME—$S_6$ | 100 |
| TMME—$S_7$ | 100 |
| TMME—$S_8$ | 100 |
| TMME—$S_{10}$ | 100 |
| TMME—$S_{12}$ | 100 |
| "Captan" | [1] 90 |
| "PCNB" | [1] 91 |
| "Phygon" | [1] 83 |

[1] At 1000 p.p.m.

TMME—$S_4$ was tested for control of sclerotium root rot of beans in the following wettable powder formulation:

| | Parts by weight |
|---|---|
| TMME—$S_4$ | 10.0 |
| Attapulgus clay | 30.0 |
| "Neoterge" wetting agent | 0.12 |
| "Duponol ME" wetting agent | 0.05 |
| Lignin sulfate suspending agent | 0.12 |

The test composition was prepared by grinding the components together in a hand mortar followed by tumbling in a tumble-mill for 1 hour, after which it was admixed with Sclerotium infested soil in an amount sufficient to provide 100 p.p.m. of the active ingredient. Each of fifty cardboard cartons was filled with the treated soil and planted with bean seeds. After storing in a greenhouse for 21 days, the cartons were examined to determine how many plants had emerged and what proportion of the emerged plants had remained healthy. Comparisons were made with sterile fumigated soil and with untreated Sclerotium infested soil. The following data were obtained:

| | Percent of plants emerging | Percent of plants remaining healthy |
|---|---|---|
| Sterile fumigated soil | 98 | 100 |
| Sclerotium infested soil | 64 | 0 |
| Sclerotium infested soil + 100 p.p.m. of TMME—$S_4$ | 94 | 91.5 |

Similar results were obtained with TMME—$S_{2.5}$, TMME—$S_8$, TEME—$S_2$, and TIME—$S_4$. By means of similar greenhouse test procedure, various members of the present class of sulfurized compounds were found to give good control of Rhizoctonia on cotton, Alternaria on tomatoes, and Helminthosporum on corn.

In addition to the fungicidal activity demonstrated above, the present sulfurized compounds are effective in controlling plant disease-inducing bacteria. The wettable powder formulation was tested as follows: The formulation is dispersed in water to form a concentrate, and sufficient of the concentrate is added to a standard culture medium consisting of potato dextrose agar, yeast extract and calcium carbonate to obtain a culture medium containing 100 p.p.m. of the active ingredient. Four samples of the medium so prepared are then inoculated with Erwinia carotovora, Pseudomonos syringae, Agrobacterium tumefaciens, and Xanthamonas juglandis. After incubation for two days the innoculated media are examined for bacterial growth. The following data were obtained by subjecting a number of the present sulfurized compounds to such procedure:

| Active ingredient: | Percent kill of 4 bacteria tested |
|---|---|
| TMME—$S_2$ | 75 |
| TMME—$S_{2.5}$ | 100 |
| TMME—$S_3$ | 75 |
| TMME—$S_4$ | 75 |
| TMME—$S_5$ | 100 |
| TMME—$S_6$ | 100 |
| TMME—$S_7$ | 100 |
| TMME—$S_8$ | 100 |
| TMME—$S_{10}$ | 100 |
| TMME—$S_{12}$ | 100 |

In addition to the foregoing, the present class of sulfurized compounds has been found to be remarkably effective in controlling nematodes. In tests carried out with the wettable powder formulation described above, and employing the active ingredient in concentrations ranging from 50 to 300 p.p.m., either as a root or bulb dip or for direct soil injection, excellent control of the following types of nematodes was obtained:

Root knot nematodes on gladiolus bulbs.
Root knot nematodes on tomato plants.
Root knot nematodes on carnation plants.
Root lesion nematodes on daffodil plants.
Root lesion nematodes on rose plants.
Citrus nematodes on citrus trees.
Sugar beet nematodes on sugar beet plants.

The present sulfurized compounds have also been found effective against *paratetranachus* mites, leaf mites on roses, bulb mites on gladioli, powdery mildew on apples, pears and peaches, bacterial scab on gladioli, brown rot on peaches and apples, leaf curl scale on peaches, and others.

Other modes of applying the principle of our invention may be employed instead of those explained, change being made as regards the materials or methods employed, provided the step or products stated by any of the appended claims or the equivalent of such stated step or product, be employed or obtained.

This application is a continuation-in-part of our copending application, Serial No. 582,956, filed May 7, 1956, now forfeited.

We, therefore, particularly point out and distinctly claim as our invention:

1. A sulfurized tetrakis(alkylmercapto)ethane obtained by heating a mixture comprising elemental sulfur and a tetrakis(alkylmercapto)ethane having the general formula

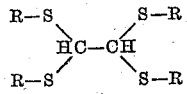

wherein each R represents an alkyl radical containing from 1 to 3 carbon atoms, at a temperature between about 125° C. and about 200° C. for a period of time between about ¼ and about 24 hours, said mixture containing between 1 and about 20 atomic weights of sulfur per molecular weight of tetrakis(alkylmercapto)ethane and said conditions of time and temperature being such that between about 1 and about 20 atoms of sulfur combine with each mole of tetrakis(alkylmercapto)ethane.

2. A product as defined by claim 1 wherein the said tetrakis(alkylmercapto)ethane is tetrakis(methylmercapto)ethane.

3. A product as defined by claim 1 wherein the said tetrakis(alkylmercapto)ethane is tetrakis(ethylmercapto)ethane.

4. A product as defined by claim 1 wherein the said tetrakis(alkylmercapto)ethane is tetrakis(isopropylmercapto)ethane.

5. A sulfurized tetrakis(alkylmercapto)ethane obtained by heating a mixture comprising elemental sulfur and a tetrakis(alkylmercapto)ethane having the general formula

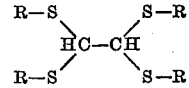

wherein each R represents an alkyl radical containing from 1 to 3 carbon atoms, at a temperature between about 125° C. and about 200° C. for a period of time between about ¼ and about 24 hours, said mixture containing between 1 and about 8 atomic weights of sulfur per molecular weight of tetrakis(alkylmercapto)ethane and said conditions of time and temperature being such that between about 1 and about 8 atoms of sulfur combine with each mole of tetrakis(alkylmercapto)ethane.

6. A product as defined by claim 5 wherein the said tetrakis(alkylmercapto)ethane is tetrakis(methylmercapto)ethane.

7. A pesticidal composition comprising an inert pesticidal carrier material and, as the essential active ingredient, a sulfurized product obtained by heating a mixture comprising elemental sulfur and a tetrakis(alkylmercapto)ethane having the general formula:

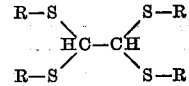

wherein each R represents an alkyl radical containing from 1 to 3 carbon atoms, at a temperature between about 125° C. and about 200° C. for a period of time between about ¼ and about 24 hours, said mixture containing between 1 and about 20 atomic weights of sulfur per molecular weight of tetrakis(alkylmercapto)ethane and said conditions of time and temperature being such that between about 1 to about 20 atoms of sulfur combined with each mole of tetrakis(alkylmercapto)ethane.

8. A composition as defined by claim 7 wherein the combined with each mole of tetrakis(alkylmercapto)mercapto)ethane.

9. A composition as defined by claim 7 wherein the said carrier material comprises water and sufficient of a dispersing agent to maintain the said active ingredient uniformly dispersed in said water.

10. A composition as defined in claim 7 wherein the said carrier comprises an inert particulate solid.

11. A pesticidal composition comprising an inert pesticidal carrier material and, as the essential active ingredient, a sulfurized product obtained by heating a mixture comprising elemental sulfur and a tetrakis-(alkylmercapto)ethane having the general formula

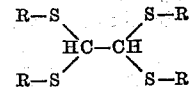

wherein each R represents an alkyl radical containing from 1 to 3 carbon atoms, at a temperature between about 125° C. and about 200° C. for a period of time between about ¼ and about 24 hours, said mixture containing between 1 and about 8 atomic weights of sulfur per molecular weight of tetrakis(alkylmercapto)ethane and said conditions of time and temperature being such that between about 1 and about 8 atoms of sulfur combine with each mole of tetrakis(alkylmercapto)ethane.

12. A composition as defined by claim 11 wherein the said tetrakis(alkylmercapto)ethane is tetrakis(methylmercapto)ethane.

13. A composition as defined by claim 11 wherein the said carrier material comprises water and sufficient of a dispersing agent to maintain said active ingredient uniformly dispersed in said water.

14. A composition as defined by claim 11 wherein the said carrier material comprises an inert particulate solid.

15. The method of preventing and controlling the growth of fungi, nematodes and mites on plant materials which comprises applying thereto an effective non-phytotoxic amount of a sulfurized tetrakis(alkylmercapto)-ethane obtained by heating a mixture comprising elemental sulfur and a tetrakis(alkylmercapto)ethane having the general formula

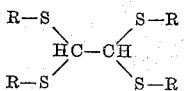

wherein each R represents an alkyl radical containing from 1 to 3 carbon atoms, at a temperature between about 125° C. and about 200° C. for a period of time between about ¼ and about 24 hours, said mixture containing between 1 and about 20 atomic weights of sulfur per molecular weight of tetrakis(alkylmercapto)-ethane and said conditions of time and temperature being such that between about 1 and about 20 atoms of sulfur combine with each mole of tetrakis(alkylmercapto)ethane.

16. The method of claim 15 wherein the said tetrakis-(alkylmercapto)ethane is tetrakis(methylmercapto)-ethane.

17. The method of preventing and controlling the growth of fungi, nematodes and mites on plant materials which comprises applying thereto an effective non-phytotoxic amount of a sulfurized tetrakis(alkylmercapto)ethane obtained by heating a mixture comprising elemental sulfur and a tetrakis(alkylmercapto)ethane having the general formula

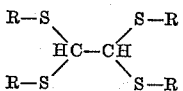

wherein each R represents an alkyl radical containing from 1 to 3 carbon atoms, at a temperature between about 125° C. and about 200° C. for a period of time between about ¼ and about 24 hours, said mixture containing between 1 and about 8 atomic weights of sulfur per molecular weight of tetrakis(alkylmercapto)ethane and said conditions of time and temperature being such that between about 1 and about 8 atoms of sulfur combine with each mole of tetrakis(alkylmercapto)ethane.

18. The method of claim 17 wherein the said tetrakis-(alkylmercapto)ethane is tetrakis(methylmercapto)ethane.

19. The method of controlling fungi and nematodes in soil infested with the same which comprises admixing with said soil a non-phytotoxic fungicidal and nematocidal amount of a sulfurized tetrakis(alkylmercapto)ethane obtained by heating a mixture comprising elemental sulfur and a tetrakis(alkylmercapto)ethane having the general formula

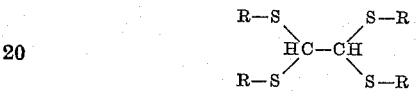

wherein each R represents an alkyl radical containing from 1 to 3 carbon atoms, at a temperature between about 125° C. and about 200° C. for a period of time between about ¼ and about 24 hours, said mixture containing between 1 and about 20 atomic weights of sulfur per molecular weight of tetrakis(alkylmercapto)-ethane and said conditions of time and temperature being such that between about 1 and about 20 atoms of sulfur combine with each mole of tetrakis(alkylmercapto)-ethane.

20. The method of claim 19 wherein the said tetrakis-(alkylmercapto)ethane is tetrakis(methylmercapto)-ethane.

References Cited in the file of this patent

Journal Amer. Chem. Soc., Schreyer, 73, p. 2962 (1951).

UNITED STATES PATENT OFFICE
CERTIFICATE OF CORRECTION

Patent No. 2,910,401                                                October 27, 1959

Irving D. Webb et al.

It is hereby certified that error appears in the printed specification of the above numbered patent requiring correction and that the said Letters Patent should read as corrected below.

Column 5, lines 56 to 59, inclusive, the formula should appear as below instead of as in the patent:

$$100 - \frac{\text{Growth on Test Sample}}{\text{Growth on Blank}} \times 100$$

column 8, line 37, for "to" read -- and --; line 42, for "combined with each mole of tetrakis(alkylmercapto)-" read -- said tetrakis(alkylmercapto)ethane is tetrakis(methyl- --.

Signed and sealed this 17th day of May 1960.

(SEAL)
Attest:

KARL H. AXLINE                                                ROBERT C. WATSON
Attesting Officer                                        Commissioner of Patents